United States Patent [19]

Wescott et al.

[11] 4,074,852

[45] Feb. 21, 1978

[54] SYMBOL DECODING METHOD AND MEANS

[75] Inventors: Robert D. Wescott; John B. Christie, both of Ithaca, N.Y.

[73] Assignee: NCR Corporation, Dayton, Ohio

[21] Appl. No.: 748,252

[22] Filed: Dec. 6, 1976

[51] Int. Cl.$^2$ .......................... G06K 7/10; G08C 9/06
[52] U.S. Cl. ...................................... 235/463; 250/569
[58] Field of Search ................. 235/61.11 E, 61.11 D; 360/2; 250/555, 566, 568, 569

[56] References Cited

U.S. PATENT DOCUMENTS

| | | | |
|---|---|---|---|
| 3,860,792 | 1/1975 | Myren | 235/61.11 E |
| 3,864,548 | 2/1975 | O'Neil, Jr. et al. | 235/61.11 E |
| 3,979,577 | 9/1976 | Seligman | 235/61.11 E |
| 4,000,397 | 12/1976 | Hebert et al. | 235/61.11 E |

*Primary Examiner*—Daryl W. Cook

*Attorney, Agent, or Firm*—J. T. Cavender; Albert L. Sessler, Jr.

[57] ABSTRACT

Symbol decoding method and means are provided for identifying special symbols such as "start of tag" and "end of tag" forming part of a record contained on record media or placed directly on articles or credit cards in coded form such as a bar code. Various clock frequencies are applied through gates to counters for periods of time corresponding to sensed characteristics such as width of various components of the coded record in such manner that the final condition of the counter at the completion of sensing of the symbol provides an indication of the identity of the symbol. The counters may be of the up-down type, so that clock signals corresponding to different code components can cause the counter to count in different directions. Two counters are employed for detection of each of the "start of tag" and "end of tag" symbols so that the testing for the symbols can be commenced with successive components of the code.

32 Claims, 11 Drawing Figures

SYMBOL DECODING METHOD AND MEANS

BACKGROUND OF THE INVENTION

This invention relates to a novel method and means for decoding indicia from record media, and more particularly relates to a method means for identifying a unique symbol encoded by means of the use of bars of different widths and/or intervals on record media.

For purposes of increasing economy and efficiency of operation, a number of systems have been proposed involving the use of machine readable indicia in connection with various types of automated businesses such as supermarkets and other types of retail establishments, as well as banks, etc. Such machine-readable indicia may be employed on customer identification or credit cards, on articles sold in supermarkets, etc. Examples of such machine readable codes and associated apparatus for encoding and decoding may be found, for example, in U.S. Pat. Nos. 3,731,710; 3,731,064; 3,792,236; and Re. 28,198.

Particularly in the case of articles on which the wrapping or container includes thereon a large amount of other information, such as a picture and description of the goods, a trademark, etc., it is important that the machine-readable coded information also appearing thereon be distinguishable from the other information on the wrapping or container. This has been done in the past by using a special symbol or symbols to designate the beginning and end of the machine readable information. The importance of having such symbol or symbols, and assuring that they are readable without error by the decoding means, may readily be seen.

Certain factors may contribute to the difficulty of correctly identifying such symbols, such as the tendency of ink to spread slightly in the case of printed bar code information. A problem is also presented, in certain instances, when the background on which the information is to be encoded has certain characteristics which will appear to the decoding device to be similar to the encoded information. A successful decoding device must therefore be capable of correct decoding even in the event of some imprecision in the printing or other means employed for placement of the encoded information on the record media or article.

SUMMARY OF THE INVENTION

In accordance with the invention, a novel method and means are provided for identifying one or more unique symbols. Such symbols may find a variety of uses, one of which is to indicate the beginning or end of a coded record.

The decoding means of the present invention utilizes counters as means for testing symbols to identify them. Inputs to the counters are through gates which combine signals derived from means which sense the encoded information with signals of different frequencies determined in accordance with an equation based upon the relationship of certain components of the unique coded symbol to each other. In the illustrated embodiment, the counters are up-down counters and the input gates associated with them are connected in such manner that certain of the input signals drive the counters in one direction while others of said signals drive the counters in the opposite direction. The final condition of the counters at the conclusion of sensing of a given symbol thus identifies whether or not the symbol is the unique symbol in question.

In the illustrated embodiment, two counters are provided for decoding each of the "start of tag" and "end of tag" symbols, for a total of four counters. Signals representing components of the code are paired to provide "odd" and "even" waveforms, one such waveform being the mirror image of the other. The terms "odd" and "even" are used arbitrarily to distinguish the two waveforms, and do not have their usual mathematical significance. A pair of counter banks is provided for detecting each of the "start of tag" and "end of tag" symbols, so that any combination of "odd" and "even" signals with signals representing individual components of the coded indicia may be checked to determine the presence of a "start of tag" or "end of tag" symbol.

In accordance with the invention, symbol decoding means comprise scanning means for scanning a surface upon which coded data has been placed and generating a signal representative of the information scanned; means for generating a plurality of clock signals of different frequencies with the relationship of the frequencies being based upon the relationship of a plurality of components of a code symbol to be identified; counting means; and means for applying the various frequencies to the counting means in accordance with the relationship of the different components of a symbol being scanned, whereby the conditon of the counting means at the end of a scan of data provides an indication of whether or not the data scanned is the symbol.

In accordance with another aspect of the invention, a method for detecting a unique symbol represented by a combination of bars and spaces for compensating for width variations in the printing of said bars comprises the steps of establishing a predetermined ratio of given dimensions of bars and spaces for the unique symbol to be detected, said ratio taking into account a variation from standard width resulting from the manner in which bars are printed, to determine weights to be assigned to various bars and spaces of a symbol to be tested, assigning different weights to the various widths measured in accordance with the relationship of bars and spaces in said unique symbol, and making a comparison of the weighted measurements to determine whether or not the symbol sensed is the unique symbol.

It is accordingly an object of the present invention to provide an improved decoding system.

Another object is to provide means for decoding unique symbols in a coded record.

A further object is to provide means for decoding "start of tag" and "end of tag"]symbols in a coded record of the bar code type.

Yet another object is to provide means for detecting the beginning and ending of a coded record.

Yet another object is to provide means for decoding unique symbols in a coded record, said means being capable of compensating for error in the coded record resulting from ink spread introduced in the printing of the coded record.

Yet another object is to provide means to decode, in a bar code on a tag, a ratio of bars and spaces which is unique to the beginning or end of a tag and cannot occur elsewhere in the tag.

Yet another object is to provide a method for detecting a unique symbol encoded on record media.

Yet another object is to provide a method for detecting a unique symbol represented by a combination of contrasting areas.

Yet another object is to provide a method for decoding "start of tag" and "end of tag" symbols in a coded record of the bar code type.

BRIEF DESCRIPTION OF THE DRAWINGS

Other objects and advantages of the invention will be apparent from the following detailed description and the accompanying drawings, in which.

DESCRIPTION OF THE PRESENT EMBODIMENT

Figures 1, 4:
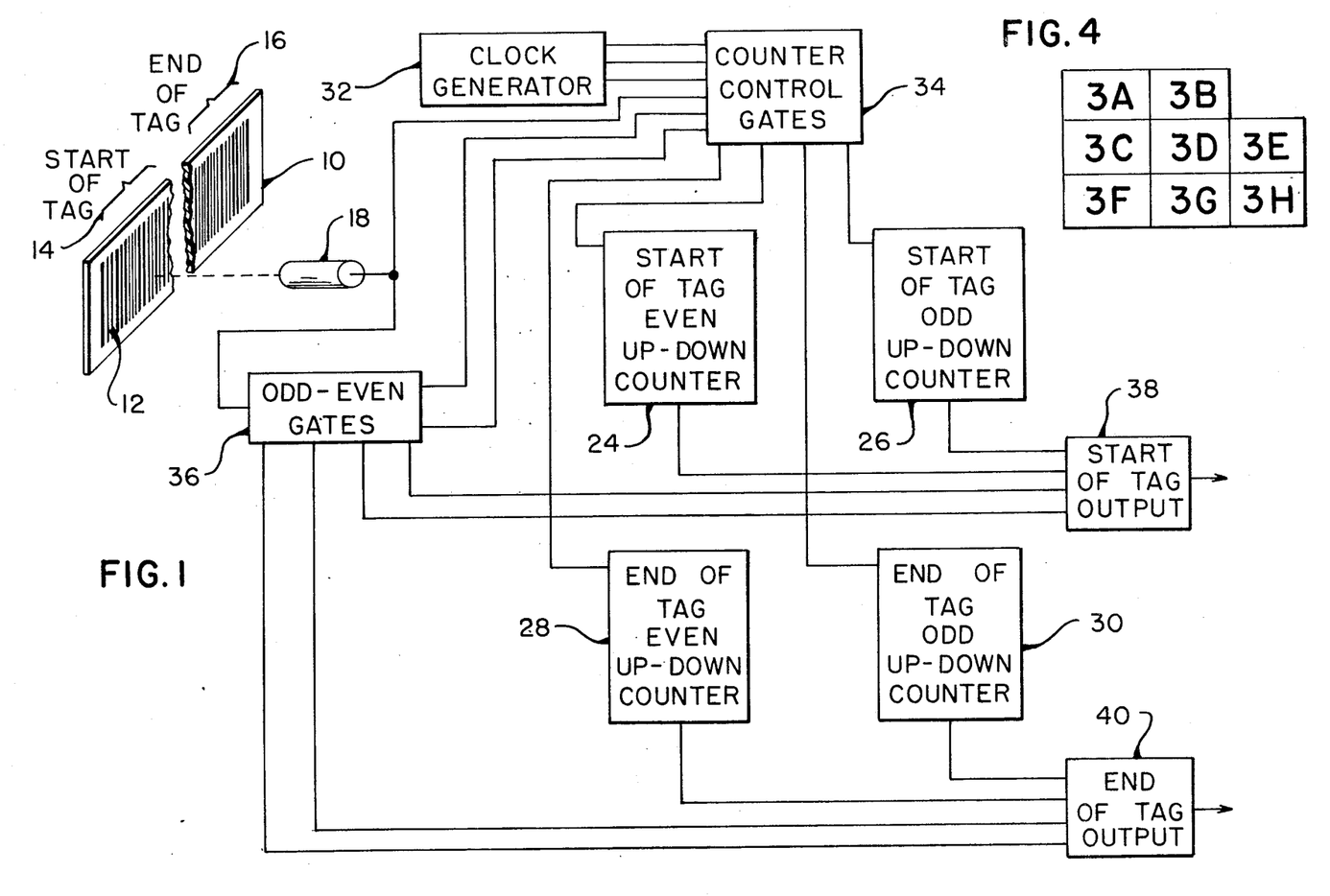
FIG. 1 is a block diagram of a decoding system embodying the present invention.
FIG. 4 shows the manner in which FIGS. 3A to 3H inclusive are to be joined to each other to constitute a unitary logic diagram.

In FIG. 1 is shown a tag 10, on which appears a bar code consisting of relatively dark bars 12 on a relatively light background. The bars may be located on the tag with respect to each other in any one of several arrangements, according to the particular code to be used. One widely accepted code is the Universal Product Code, employed by many manufacturers and sales establishments. Bar widths and distances between bars may be varied according to the particular code employed. The present invention is not limited to any particular code. For purpose of illustration, a particular symbol representing "start of tag" or "end of tag" is shown, in order that an example may be given as to the specific means for decoding it, but it will be understood that many different symbols, with corresponding variations in the decoding means, could be employed within the scope of the present invention.

In FIG. 1, the "start of tag" symbol is enclosed by the bracket 14 and the "end of tag" symbol is enclosed by the bracket 16. Due to the scale of the drawing, no effort has been made to reproduce the precise arrangements of bars and spaces used for these symbols. Between the "start of tag" and "end of tag" symbols on the tag 10 are a number of symbols representing data relating to the article, person or other object with which the tag is associated. The tag is shown as broken in the center portion in FIG. 1, and may be of any desired length.

Figure 2:
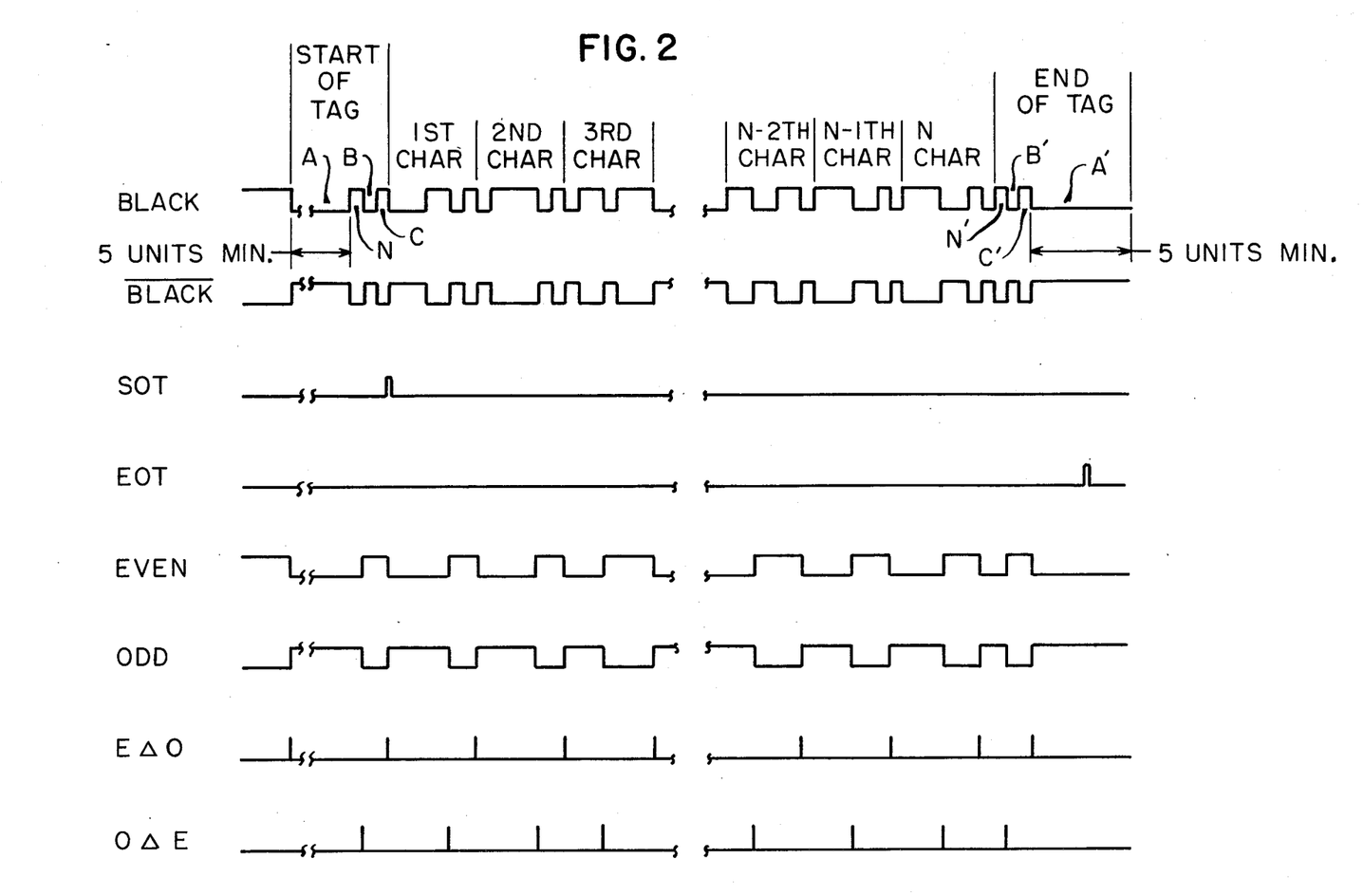
FIG. 2 is a diagrammatic showing of various waveforms useful in explaining the operation of the decoding system of the present invention.

A sensing device 18, which may be incorporated in a hand-held wand, if desired, is used to sense or scan the information contained on the tag, and generates a waveform representative of said information. Such a waveform is shown in FIG. 2, with the center portion broken to indicate that a wide variation is possible in the length of the information contained on the tag. In FIG. 2, the portions of the waveform representing, respectively, the "start of tag" and "end of tag" symbols are marked accordingly, as are portions representing data characters. In both the "start of tag" and "end of tag" portions of the waveform, a low signal level at least five units in width is adjacent to a high signal level one unit in width, followed by a low signal level one unit in width, followed in turn by a high signal level one unit in width. In the portion of the waveform representing the "start of tag" symbol at the left side of the upper waveform of FIG. 2, the five unit low-level portion of the signal is positioned to the left of the three one-unit portions of the signal, while the opposite is true of the portion of the waveform representing the "end of tag" symbol at the right side of the upper waveform.

Both the "start of tag" and the "end of tag" symbols have been selected to have a low signal level, corresponding to a white space, in excess of four units in width, since the maximum width of a low signal level, corresponding to a white space, for a data character in the Universal Product Code is four units. The provision of a nominal width of five units for the "start of tag" and "end of tag" symbols includes a tolerance factor to compensate for possible ink spread occurring during printing of the bar code record, which can reduce the width of white spaces within the coded record.

Since in the illustrated embodiment the greatest width of a white space within the coded record is four units, the system shown generally in FIG. 1 and in detail in FIGS. 3A to 3H inclusive is designed to detect a white space, constituting a margin in the case of the "start of tag" and "end of tag" symbols, equal to four and one half units. To eliminate errors arising from the effects of ink spread, only differences of whites and edge-to-edge measurements are used in evolving a mathematical expression which provides the necesssary parameters for detection of "start of tag" and "end of tag" symbols.

Let A equal the minimum margin, or white space included in the "start of tag" and "end of tag" symbols; let B equal the low level signal of one unit width; let C equal the high-level signal of one unit width; and let N equal the high-level signal of one unit width which functions as a "guard bar". These waveforms are marked for both "start of tag" and "end of tag" in FIG. 2, with A', B', C' and N' being used to designate the components of the "end of tag" symbol. Then:

$$A = 4\tfrac{1}{2} \text{ units}$$

$$A - B = 3\tfrac{1}{2} \text{ units}$$

$$A - B = 3\tfrac{1}{2}(B+C/2)$$

or $$4/11\ A = 7/11\ C + B.$$

The ratio for detection of a "start of tag" or "end of tag" symbol can thus be shown to be:

$$4/11\ A \geq 7/11\ C + B.$$

It will be noted that in the above equation, the quantities $(A-B)$ and $(B+C)$ are used, which are self-compensating with respect to errors arising from a uniform ink spread or ink contraction occurring in the printing of all bars employed in the code. That is, in $A-B$, a white width is subtracted from another white width, so that any errors are cancelled out; and in $B+C$, a white width is added to a dark width, so that any errors are also cancelled out.

It will be obvious that similar ratios could be developed for other codes in which the maximum width contained in any data symbol of a coded record is greater or less than four units, with a suitable amount being used in place of the one-half unit width to compensate for ink spread or a similar error if other forms of coding were employed. The present invention is therefore clearly not limited to the specific relationships described above.

Returning now to FIG. 1, the logic circuit shown there, broadly speaking, functions to identify the "start of tag" and "end of tag" symbols by causing counting in four up-down counter banks 24, 26, 28, 30. Counter banks 24 and 26 are used in the detection of a "start of tag" symbol, while counter banks 28 and 30 are used in the detection of an "end of tag" symbol. The two counter banks for detection of each symbol are connected to the remainder of the circuitry to respond to "even" and "odd" waveform excursions, respectively, so that counts can be carried on commencing with signals which commence, in turn, with the sensing of two consecutive white spaces on the coded record, thus avoiding the possibility of error in symbol identification by skipping a ratio comparison of incidia on the coded record.

A clock generating means shown generally at 32 in FIG. 1 is capable of generating a plurality of pulse trains of different frequencies which are used in driving the counter banks 24, 26, 28, 30. The different freqencies to be used in a given application are determined by use of a ratio equation of the type described above. It will be recalled that in the illustrated embodiment the ratio equation is:

$$4/11\ A \geqq 7/11\ C + B.$$

Therefore the ratio of the frequencies to be employed is $f$ to $4/11f$ to $7/11f$. In the illustrated embodiment, a basic frequency of 357 KHz was selected. Through means which will subsequently be explained in the description of FIGS. 3A to 3H inclusive, a second frequency of 4/11 (357) or 130 KHz, and a third frequency of 7/11 (357) or 227 KHz, are derived. These three frequencies are provided as outputs from the clock generating means 32, and are applied as inputs to a series of gates, diagrammatically represented in FIG. 1 by the block designated as counter control gates 34.

An additional input to the counter control gates 34 is provided from the sensing device 18. Broadly speaking, the input to the gates 34 from the sensing device 18 is an electronic signal having a waveform such as that shown in FIG. 2 which represents the coded record which is to be decoded; in the illustrated embodiment, the bar code printed on the tag 10.

Further inputs to the counter control gates 34 are provided by a block designated as odd-even gates 36. The sensing device 18 provides an input to the odd-even gates 36. As will subsequently be described in greater detail, the odd-even gates generate "odd" and "even" signals representing successive excursions of the waveform provided by the sensing device 18. These "odd" and "even" signals are presented to the counter control gates 34, and cause selected ones of the three frequencies to be input to selected ones of the counter banks 24, 26, 28, 30 at selected times for durations corresponding to the durations of the excursions of the waveform generated by the sensing device 18.

The odd-even gates 36 also provide inputs to two blocks designated "start of tag" output 38 and "end of tag" output 40. The block 38 also receives inputs from the counter banks 24, 26 and the block 40 also receives inputs from the counter banks 28, 30. The outputs from the blocks 38, 40 provide indications as to whether or not the symbol sensed is a "start of tag" or "end of tag".

At the start of tag sensing, the counter banks are reset by a pulse generated by the odd-even gates 36. During a first period of five units width, with the logic level low for a period corresponding to the duration of the first waveform excursion, one of the counter banks is counted up at a rate of $4/11f$, or 130 KHz. During the next period, of one unit width, with the logic level high, no counting occurs. During the third period, of one unit width, with the logic level low, the selected counter bank is counted down at a rate of $f$, or 357 KHz. During the final period associated with the symbol being sensed, of one unit width, with the logic level high, the selected counter bank is counted down at a rate of $7/11f$, or 227 KHz. It will be seen that if the initial excursion is four and one half or more units wide, and the third and fourth excursions are each one unit in width, the count down will not reach zero, and an output from the counter bank to the "start of tag" output 38 will remain low. At the end of the fourth excursion of the waveform the output from the odd-even gates 36 will also go low, causing a low output from the "start of tag" output 38, indicating that a "start of tag" symbol has been sensed from the tag 10.

An "end of tag" output signal is generated by the block 40 by a similar sequence. A pulse from the odd-even gates 36 resets one of the counter banks 28, 30. No counting takes place during the first one-unit-wide excursion of the symbol being sensed. The counter bank is then counted up during the second and third one-unit wide excursions of the symbol being sensed, at rates of $f$, or 357 KHz, and $7/11f$, or 227 KHz, respectively, after which the counter bank is counted down at a rate of $4/11f$, or 130 KHz, during the final excursion. When the ratio is reached in this instance, the counter bank generates a low pulse which is presented to one of the inputs of the "end of tag" output 40, which is gated to the output of said block when the other input from the odd-even gates 36 goes to a low logic level, thus providing an indication that an "end of tag" symbol has been sensed from the tag 10 by the sensing device 18.

As mentioned previously, those portions of the logic circuitry relating to both the "start of tag" and the "end of tag" are essentially duplicated with circuits that are counting in opposite directions. This allows every combination of both "odd" and "even" signals with signals representing individual components of the coded indicia to be checked for the particular ratio of waveform widths indicative of "start of tag" or "end of tag".

Reference should now be had to the logic diagram of FIGS. 3A to 3H inclusive. It will be noted that the arrangement of these figures to form a unitary diagram is shown in FIG. 4. It will also be noted that each of the logical components in FIGS. 3A to 3H inclusive contains therein a numerical designation, which is an identification of a standard component in accordance with a recognized industry code.

As has been previously mentioned, three frequencies, namely $f$, $4/11f$ and $7/11f$, are required for the circuitry of FIGS. 3A to 3H inclusive. The output of the inverter 56 represents the frequency $f$, of 357 KHz. This frequency is derived by providing a frequency of 1.428 MHz as an input to a binary counter 50 of FIG. 3A. This input is divided into four states in the counter 50 and the second of the four states is used as an output. That is, whenever a binary two is output from the counter 50, the input to an inverter 60 is low, while one input to a NAND gate 58 directly from the counter 50 is high. The output of the inverter 60 is inverted and applied to the second input of the NAND gate 58. This condition causes the output of the NAND gate 56 to go low and provides the aforementioned frequency of 357 KHz. The output from the NAND gate 58 is inverted by the inverter 56.

Figure 3A:
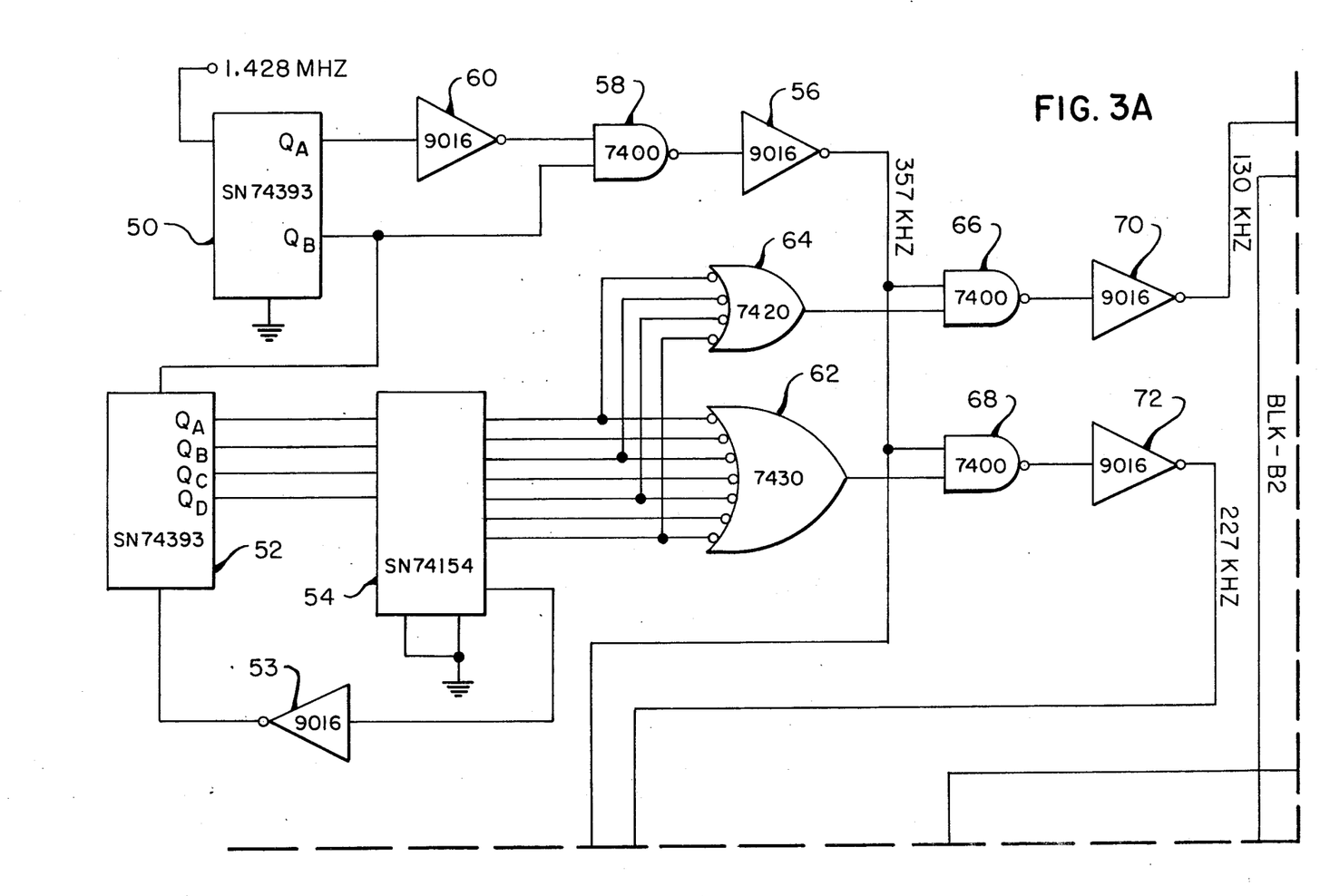
FIGS. 3A, 3B, 3C, 3D, 3E, 3F, 3G and 3H taken together constitute a diagrammatic showing of the logic elements employed in the illustrated embodiment of the present invention.

A 357 KHz signal is fed from the counter 50 to a second counter 52, which actually may be one half of a counter made up of both elements 50 and 52. The outputs of the counter 52, four in number, are applied to inputs of a decoder 54. Seven outputs from the decoder 54 extend to a NAND gate 62, and four of these seven outputs are also connected to a NAND gate 64.

It should further be noted that when the decoder 54 reaches a count of eleven, the output therefrom is presented through an inverter 53 to a reset input of the counter 52, causing said counter to be reset. Therefore the counter decoder configuration comprising the counter 52 and the decoder 54 represents a common divide-by-eleven circuit whose eleven states are available as outputs from the decoder 54. The output from the NAND gate 64 provides one input to a NAND gate 66, the other input of which is applied from the output of the inverter 56. The output from the NAND gate 66 therefore provides four pulses for every eleven pulses input to said gate from the inverter 56. This provides an oscillation at the output of the NAND gate 66 which is inverted by the inverter 70 to provide a frequency of 130 KHz.

Similarly, seven of the eleven pulses from the decoder 54 are applied, as stated, to the NAND gate 62, as is the output from the inverter 56, so that an output from the NAND gate 68 is provided for seven of every eleven pulses applied from the inverter 56. This output passes through an inverter 72, at the output of which is provided a frequency of 227 KHz.

Referring now to FIG. 2, the "black" waveform shown there represents the signal derived from the sensing device 18 when sensing a tag 10. It will be noted that the "black" waveform, as well as the other waveforms of FIG. 2, are broken in the center, to indicate that a longer record than is shown in FIG. 2 may be included on the tag 10 and sensed by the sensing device 18. The "odd" and "even" signals also appearing in FIG. 2 are derived from the "black" signal, by logic elements which will subsequently be described. It will be noted that the "odd" and "even" waveforms are in effect mirror images of each other; that is, when one is at a high logic level, the other is at a low logic level, and vice versa. The state or level of these signals may be either high or low at the beginning of sensing of any particular tag, depending upon the previous condition of the logic circuitry. Let it be assumed that at the beginning of sensing of the margin of the tag 10, when the "black" signal shifts from a high to a low level, the "even" signal shifts from a high to a low level, as shown in FIG. 2, while the "odd" signal shifts from a low to a high level. Due to the manner in which the logic circuitry of FIGS. 3A to 3H has been designed, this implies that the counter bank 24 (FIG. 1) which is made up in FIG. 3 by the individual up-down counters 74, 76, 78 and 80 (FIGS. 3B and 3C) will function to detect a "start of tag" symbol if one is present. It should also be noted that if the "even" waveform is at a high logic level, and the "odd" waveform is at a low logic level, then the counter bank 26 (FIG. 1), consisting of the individual up-down counters 82, 84, 86 and 88 (FIGS. 3B and 3D), will detect a "start of tag" symbol.

At the Q output of a flip-flop 90 (FIG. 3F), the "odd" signal, generated by the flip-flop 90, changes its logic level at the time of each high-to-low transition of the "black" signal shown at the left side of the waveform of FIG. 2, which is an output from the sensing device 18, and is applied as an input to the flip-flop 90. At the $\overline{Q}$ output of the flip-flop 90, the "even" signal changes state in an opposite direction from the "odd" signal at the time of each high to low transition of the "black" signal.

Figure 3B:
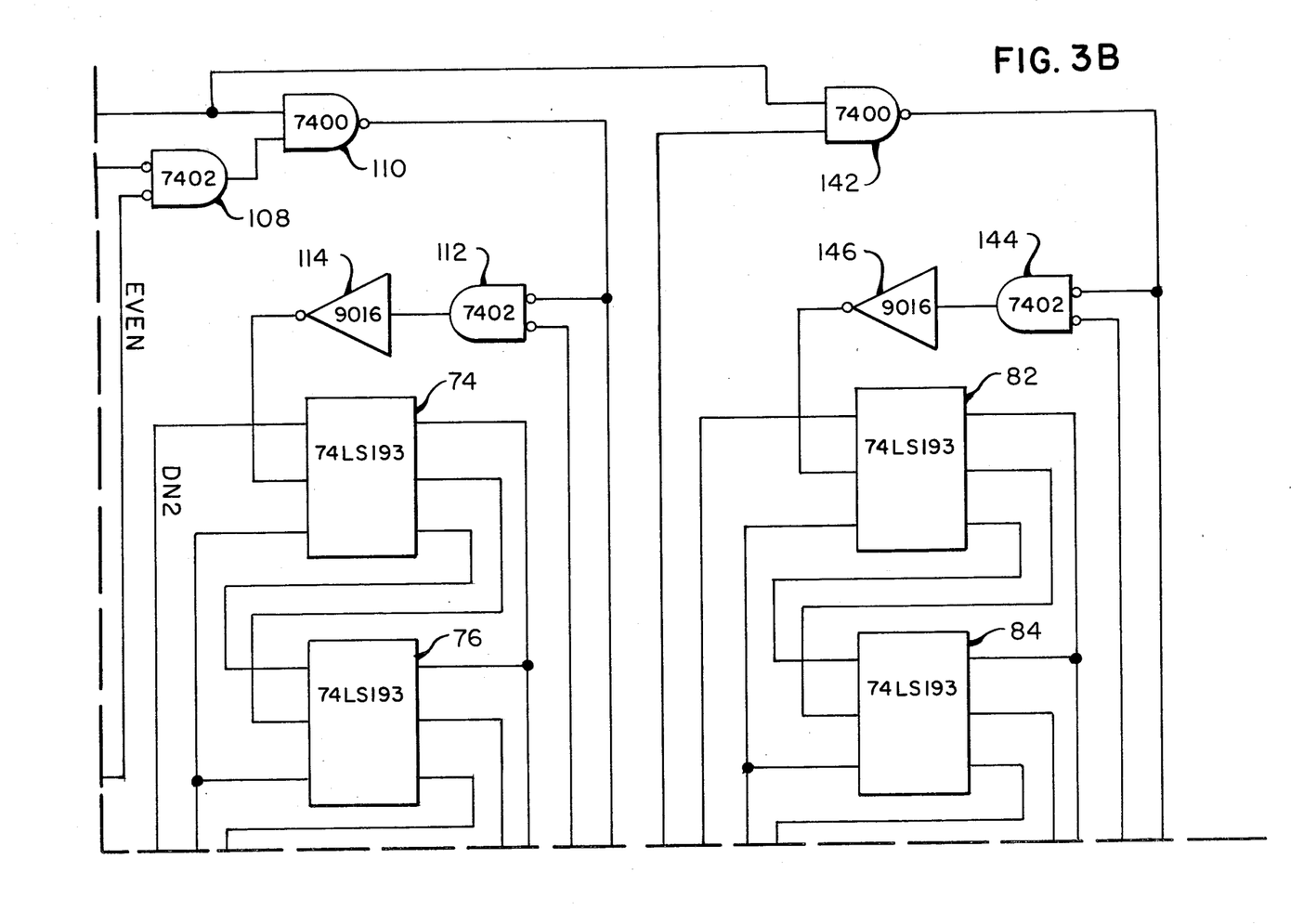
Figure 3C:
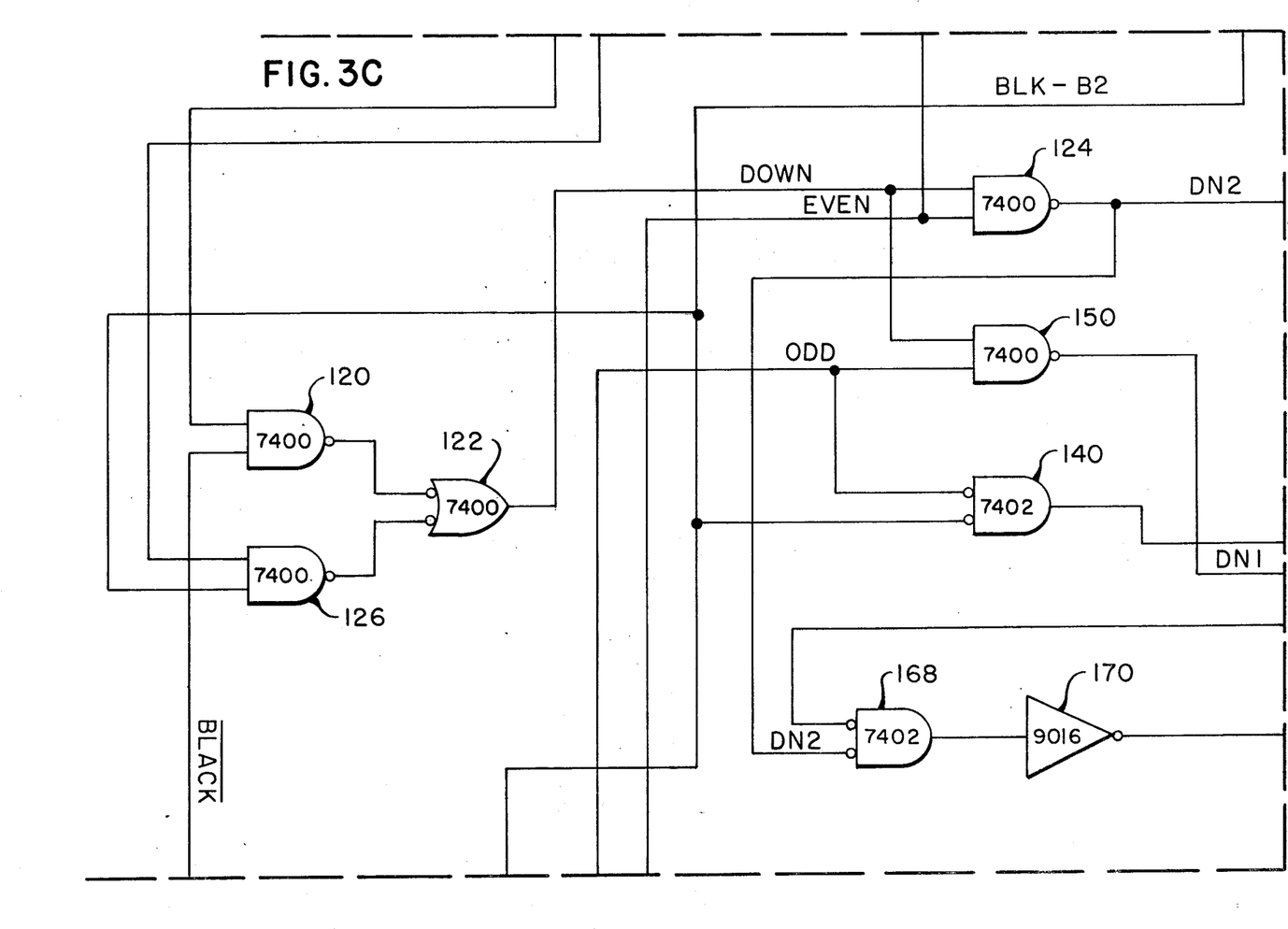
Figure 3D:
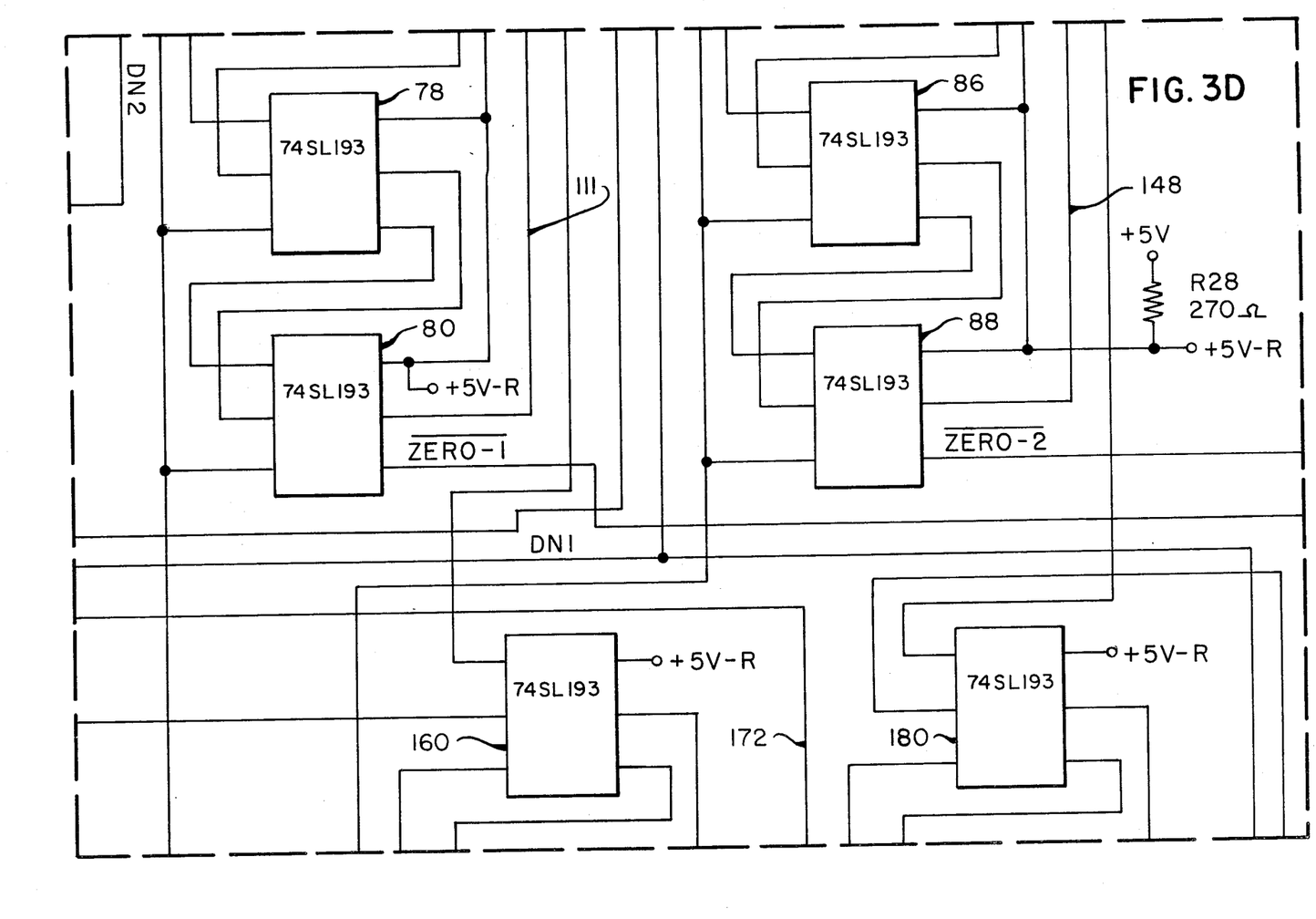
Figure 3E:
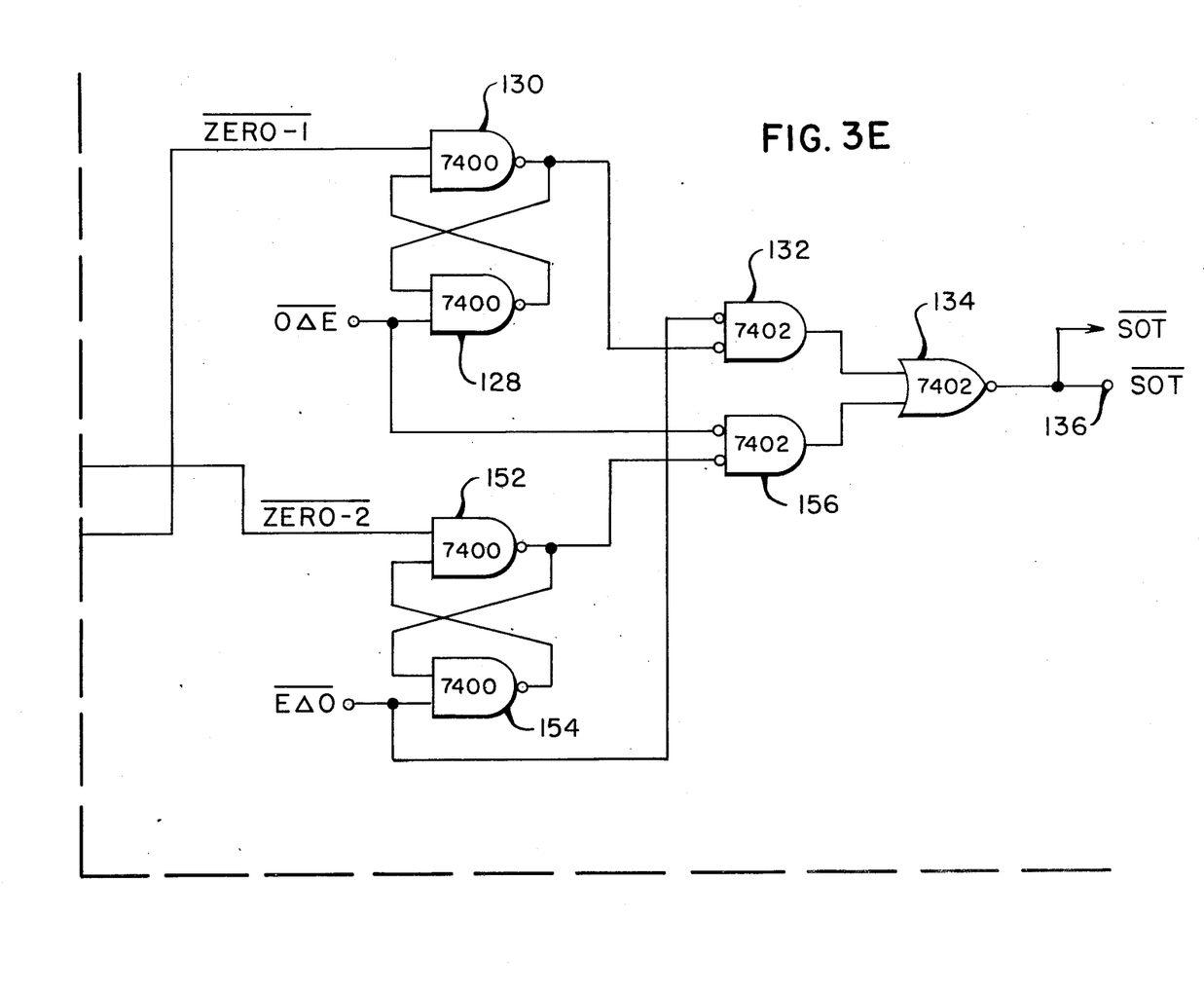
Figure 3F:
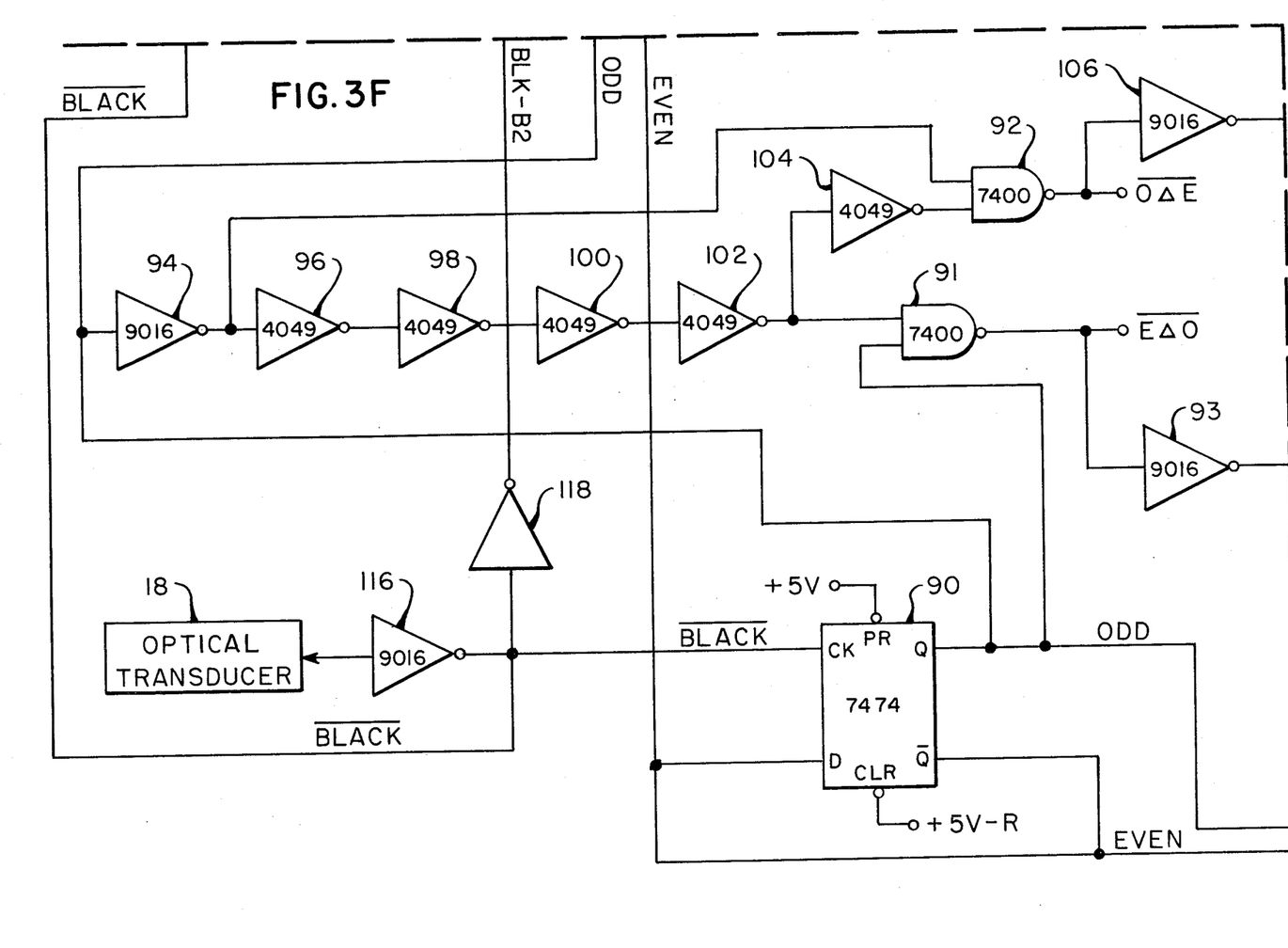
Figure 3G:
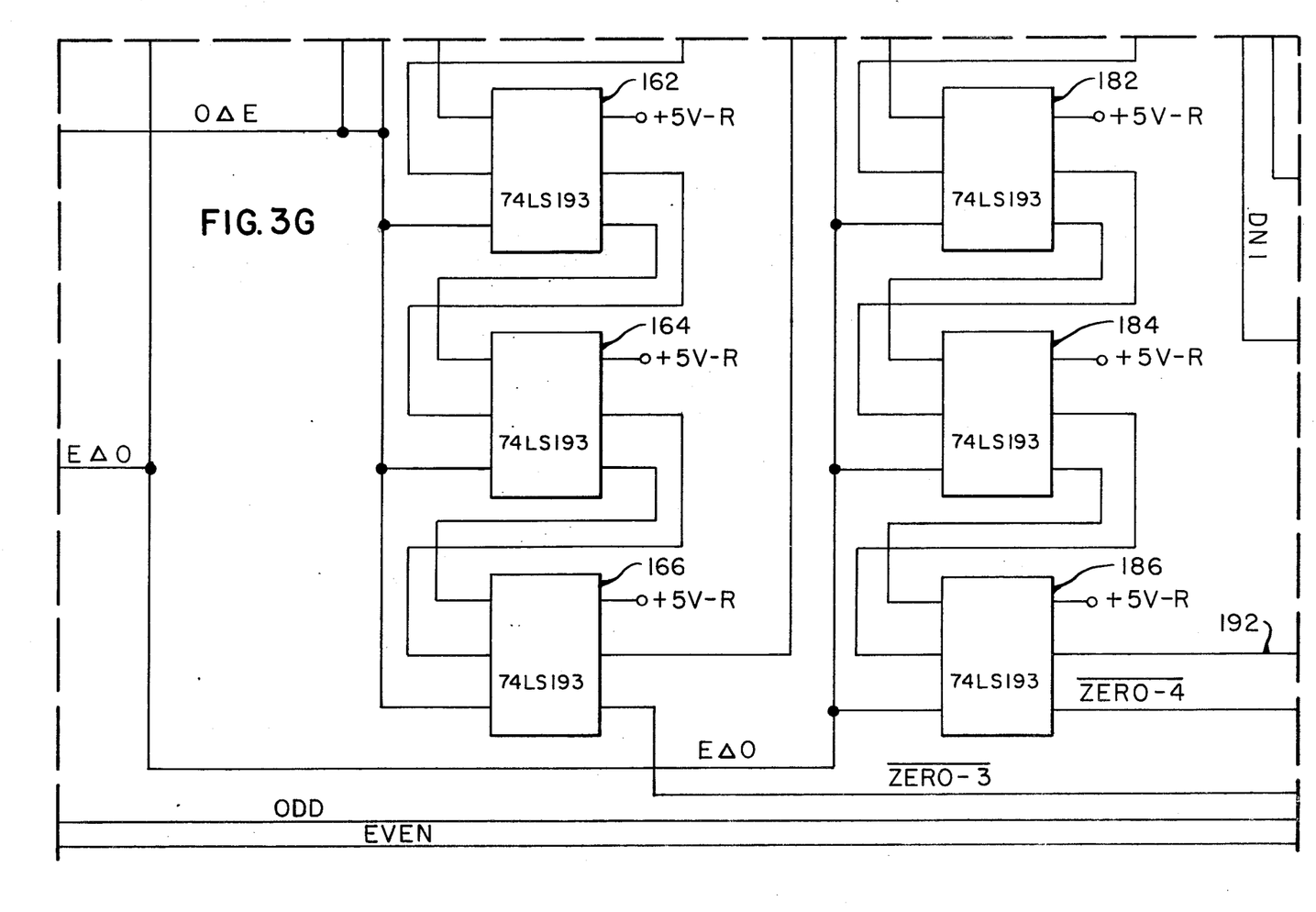

AT the time of commencement of sensing of the white portion of the "start of tag" symbol, the "odd" signal shifts from a low to a high level, which is presented to one input of a NAND gate 91 (FIG. 3F). The signal level at the other input of the NAND gate 91 is also high at this time, and remains high until the just-shifted high signal level at the input of an inverter 94 (FIG. 3F), which is also an "odd" signal, and which is inverted and delayed by the five inverters 94, 96, 98, 100 and 102, presents a low at the second input of the NAND gate 91. These two signals of high level generate a low level output signal from the NAND gate 91 which is inverted to a high signal level by an inverter 93 (FIG. 3F) and applied to each of the counters 74, 76, 78 and 80 to effect a reset of these counters to their initial positions.

It may be noted that the output signal from the NAND gate 91, as inverted by the inverter 93, is the EΔO signal also shown in FIG. 1, and that the duration of the EΔO signal is dependent upon the delay imposed on the second input to the NAND gate 91 through the delay network comprising the inverters 94, 96, 98, 100 and 102.

During the sensing of the first white area of the tag 10, the "black" signal is low, as shown in the space adjacent to the letter A on the left side of FIG. 2. Enabling low signal levels are thus provided at both inputs of a NAND gate 108 (FIG. 3B), which in turn provides a high output from the NAND gate 108 which is presented at one input of a second NAND gate 110 (FIG. 3B). The other input of the NAND gate 110 is connected to the output of the inverter 70 from which, it will be recalled, is presented a 130 KHz oscillating signal.

The output from the NAND gate 110 is applied to one input of a NOR gate 112. The other input to the gate 112 is taken by means of a conductor 111 from an output of the counter 80, and acts to prevent overflowing of the counter bank consisting of the counters 74, 76, 78 and 80. This signal is at a low logic level for the first 32,768 counts, which provides an enabling low signal at the second input of the AND gate 112. After the final count has been reached, the signal applied to said input of the gate 112 goes to a high logic level and blocks further counting.

It will thus be seen that during the time the "black" signal is low, representing the initial white space of the tag which may form a portion of the "start of tag" signal, pulses will be input into the counter bank 74, 76, 78, 80 at a rate of 130 KHz, up to the total capacity of approximately 32,000 counts of the counter bank. The output of the NAND gate 112 is inverted by an inverter 114 before being applied to the counter 74, which is in turn connected in a conventional manner with the remainder of the counter bank to provide the desired count.

It may be noted that the "black" signal applied to one input of the NAND gate 108 maintains the same relative signal levels as the signal when introduced into the circuit by the sensing device 18, since said signal is inverted twice, namely by inverters 116 (FIG. 3F) and 118. A "black" signal, which is inverted only once, by inverter 116, is the inverse of the "black" signal.

During the sensing of the first dark bar of the "start of tag" symbol, designated as N in the "black" waveform of FIG. 2, the "black" input to the NAND gate 108 is high, and therefore no counting takes place during the sensing of this bar, which is called the "guard bar".

During the next low excursion of the "black" waveform, designated B in FIG. 2, corresponding to a white space of one unit width in the "start of tag" symbol on a tag 10, the "black" signal is at a high level, and is applied to one input of a NAND gate 120 (FIG. 3C), to the other input of which a 357 KHz signal is applied from the inverter 56 (FIG. 3A). The resulting output signal from the NAND gate 120 is applied to one input of a NAND gate 122 (FIG. 3C), the output of said NAND gate being presented to one input of a NAND gate 124 (FIG. 3C), the other input of which is connected to the "even" output of the flip-flop 90, said output being high during this period. The output of the NAND gate 124 is connected to a "count down" input of the counter 74 in the bank 74, 76, 78 and 80. The counter bank is thus counted down during the time that the white space B is being sensed by the sensing device 18 from the tag 10 at a rate of 357 KHz.

During the sensing of a dark bar one unit in width following the sensing of the white space one unit in width, the "black" waveform of FIG. 2 is at a high level, as indicated by the portion marked C on the left side of said waveform. This high level signal is applied to one input of a NAND gate 126 (FIG. 3C), to the other input of which is applied an oscillating signal of 227 KHz from the inverter 72 (FIG. 3A). The resulting oscillating output signal from the gate 126 passes through the gate 122 and the gate 124 and is applied to the "count down" input of the counter 74 to cause a further counting down of the counter bank which includes the counters 74, 76, 78 and 80 during the time that the dark bar on the tag 10 is being sensed.

The manner in which the start of tag (SOT) signal is generated is as follows. At the point in time when the end of the first guard bar is sensed (that is at the fall of the waveform N of FIG. 2), the "odd" waveform, also shown in FIG. 2, makes a transition from a high level to a low level. This results in the generation of a low level OΔE pulse from the output of the NAND gate 92 (FIG. 3F). The OΔE signal is applied to one input of a NAND gate 128 (FIG. 3E) which is cross-coupled to a second NAND gate 130. The low OΔE pulse resets the flip-flop comprised of the NAND gates 128 and 130, so that the output from the gate 130 is at a low logic level. If, during the counting down of the counter bank 24, which comprises the counters 74, 76, 78 and 80, carried on during the sensing of the tag areas corresponding to excursions B and C of the black waveform, the counter is counted all of the way back to zero, a "borrow" is generated at one output of the counter 80, due to the internal configuration of the counter. This signal is designated in FIGS. 3D and 3E as ZERO-1. Presentation of such a signal at the other input of the gate 130 causes the flip-flop comprised of the NAND gates 128 and 130 to be retoggled so that the output from the gate 130 goes to a high logic level. Such an event indicates that the symbol sensed by the sensing device 18 from the tag 10 is not, in fact, a "start of tag" symbol, since the initial white area would be of a width less than that required to constitute a "start of tag" symbol. On the other hand, if the counting down during periods B and C of the "black" waveform of FIG. 2 is not sufficient to count the counter bank 24 back to zero, the ZERO-1 signal from the counter 80 remains high, and the flip-flop comprising the gates 128 and 130 is not retoggled, so that the output of the gate 130 remains low. Then, when the OΔE signal is generated at the conclusion of sensing of the second dark bar, the low output signal from the gate 130 passes through a NAND gate 132 and a NOR gate 134 to generate a SOT negative "start of tag" signal at a terminal 136.

Let it now be assumed that at the start of sensing the white margin at the "start of tag" symbol, the "odd" signal is low, and the "even" signal is high. In such case, the counter bank 26 (FIG. 1), comprising the counters 82, 84, 86, 88 (FIGS. 3B and 3D), is used to detect the "start of tag" symbol.

At the Q output of the flip-flop 90 (FIG. 3F), the "odd" signal is high and goes low, as described above, with the high to low transition of the "black" signal, as sensing of the white margin is commenced. This "odd" signal is inverted by the inverter 94 to present a high level at one input of the NAND gate 92. The other input of the gate 92 is also initially high and subsequently goes low after a delay imposed by the six inverters 94, 96, 98, 100, 102 and 104 interposed between it and the Q output of the flip-flop 90. The two high inputs produce a low output from the NAND gate 92, which is inverted by the inverter 106 to provide a high output to the reset terminal of the counters 82, 84, 86, 88, thus resetting said counters.

During sensing of the first wide white margin, the "odd" signal is low and the "black" signal is low, providing enabling low inputs to the gate 140, which in turn provides a high signal at the output of said gate and at one input of a gate 142 (FIG. 3B), the other input of which is connected to the output of the inverter 70, to provide an oscillating pulse of 130 KHz, as has been previously described. The output of the gate 142 is applied through a second gate 144 and an inverter 146 to an input of the counter 82 to cause said counter to count in accordance with the pulses applied thereto. Therefore during the sensing of the first wide white space, the counters 82, 84, 86, 88 will be counted upward at a rate of 130 KHz. Overflow of said counters is prevented by a conductor 148 which extends from a terminal on the counter 88 to the second input of the gate 144. The signal on this conductor is low for the first 32,768 counts, and then goes high to block further counting.

As has been previously stated, no counting takes place during sensing of the first dark bar of the symbol (designated N in the "black" waveform of FIG. 2).

During the sensing of the narrow white bar, represented by B on the "black" waveform of FIG. 2, the counter bank 26 is counted down at a rate of 357 KHz. During this time the "black" signal is high at one input of the gate 120, the other input of which is connected to the output of the inverter 56, to receive a 357 KHz oscillation, and the output of which is connected to one input of the NAND gate 122. The output of the NAND gate 122 is applied to one input of a NAND gate 150, the output of which is connected to a down-counting input of the counter 82 in the counter bank 26. Thus the counter will count down at a rate of 357 KHz during sensing of the white space of one unit width, which is represented by B on the "black" waveform of FIG. 2.

During the sensing of the second dark bar of the symbol, represented by C on the "black" waveform of FIG. 2, the counter bank 26 is counted down at a rate of 227 KHz. At this time, the "black" signal is high at one input of the gate 126, allowing the 227 KHz signal from the inverter 72 to be applied through the gates 126, 122 and 150 to be applied to the down-counting input of the counter 82 in the counter bank 26. Thus the counter will count down at a rate of 227 KHz during the sensing of the dark bar of one unit width, represented by C on the "black" waveform of FIG. 2.

A "start of tag" signal $\overline{SOT}$ is generated from the counter bank 26 in the same manner as previously described for the counter bank 24, except that the "borrow" signal $\overline{ZERO-2}$ from the counter 88 is applied to one input of a gate 152 (FIG. 3E) which is cross-coupled to a gate 154, the output therefrom being applied to one input of a gate 156, to the other input of which is presented an $\overline{OAE}$ signal. The output of the gate 156 is applied to the NOR gate 134 in the same manner, previously described, that the output of the gate 132 is applied to the other input of said gate 134. As previously noted, the output of the gate 134 is connected to the terminal 136, from which the "start of tag" signal is taken.

The sensing of an "end of tag" symbol will now be described. Let it be assumed that during the sensing of the first dark bar of the "end of tag" symbol known as the "guard bar", represented by N′ in the "black" waveform of FIG. 2, the "even" signal is low, and goes high as sensing of the first white space of one unit width of the "end of tag" symbol, represented by B′ in the "black" waveform of FIG. 2, is commenced. This generates a high OΔE pulse at the output of the inverter 106, in a manner which has been previously described. Said output signal is applied to the reset terminal of each of a plurality of counters 160, 162, 164, 166 (FIGS. 3D and 3G), which taken together constitute the "end of tag" counter bank 28 (FIG. 1), to reset these counters.

During sensing of the first white space, the "black" waveform is at a low logic level, the waveform "black" is at a high logic level, and the "even" waveform is at a high logic level. Accordingly, a 357 KHz oscillating signal is passed through the gates 120, 122, 124, a NOR gate 168 and an inverter 170 to the counter 160 to count up the counter stack 28.

During sensing of a second dark bar of the "end of tag" symbol, represented by C′ in the "black" waveform of FIG. 2, the "black" waveform is at a high logic level, the "black" waveform is at a low logic level, and the "even" waveform remains at a high logic level. Accordingly, a 227 KHz oscillating signal is passed through the gates 126, 122, 124 and 168, and the inverter 170, to the counter 160 to continue the counting up of the counter stack 28. A conductor 172 extends from a terminal of the counter 166 of the counter bank 28 back to one input of the gate 168 to prevent overflow of the counter bank in the same manner as previously described in connection with the counter bank 24.

Figure 3H:
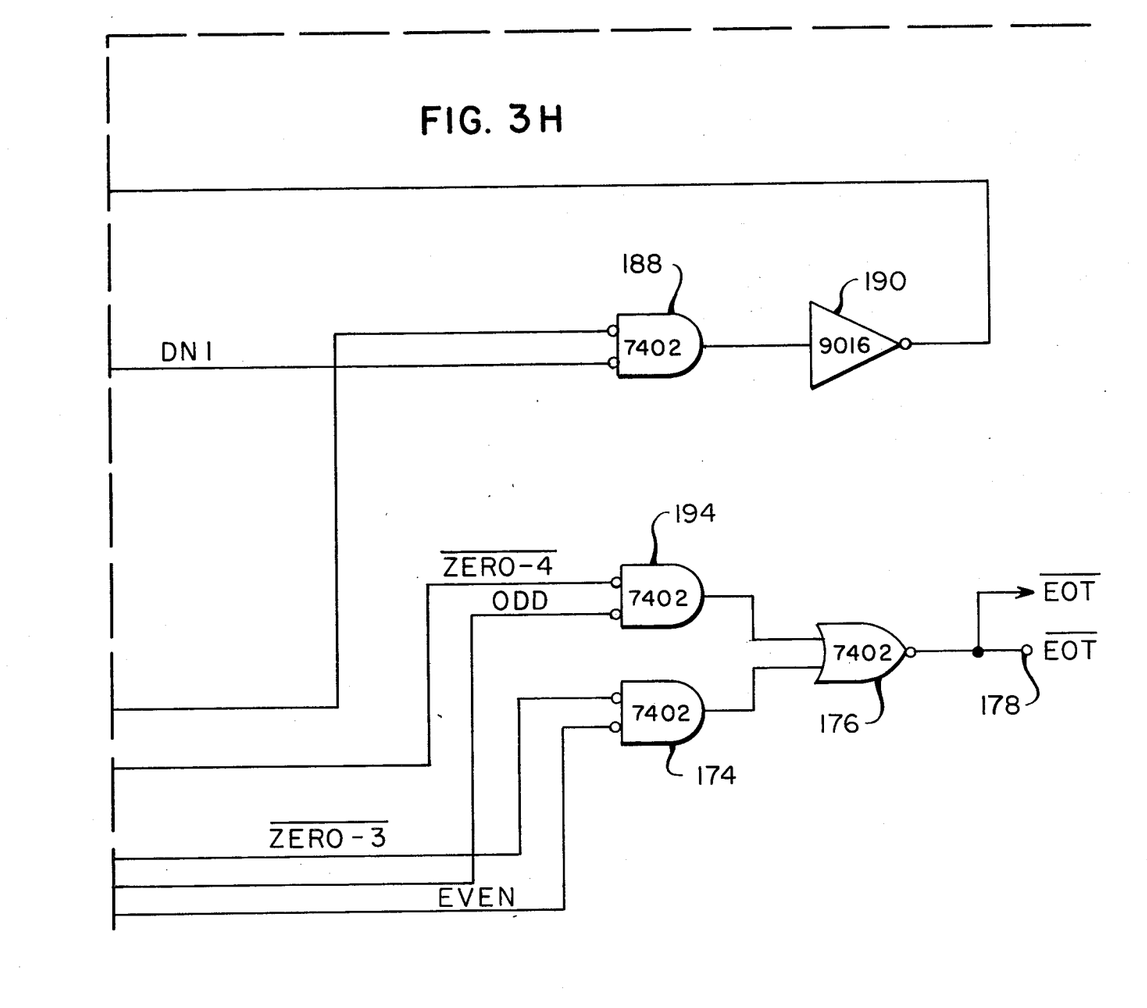

During sensing of the wide white margin area of the "end of tag" symbol, the "black" waveform is at a low logic level, the "black" waveform is at a high logic level, and the "even" waveform is at a low logic level. Accordingly, the two inputs to the NOR gate 108 (FIG. 3B) are low, providing a high output which is presented at one input of the NAND gate 110 (FIG. 3B). The 130 KHz oscillating output from the inverter 70 (FIG. 3A) accordingly passes through the gate 110 and is applied to a down-counting terminal of the counter 160 of the counter bank 28. Counting down of this counter bank continues during the sensing of the wide white margin area. The counter bank counts back to zero, as it does in the case of sensing an "end of tag" symbol, a "borrow" is generated as a low level pulse at one terminal of the counter 166, and is applied as a $\overline{ZERO-3}$ signal to one input of a NOR gate 174 (FIG. 3H). Since the "even" waveform is also low, the output of the gate 174 pulses high and is inverted by a NOR gate 176 to provide a low pulse $\overline{EOT}$ at the output of said gate, and at the terminal 178, to indicate that an "end of tag" symbol has been sensed.

Let it now be assumed that during the sensing of the first dark bar of the "end of tag" symbol (the "guard" bar) the "odd" signal is low and that said signal goes high as sensing of the first white space of one unit width of the "end of tag" symbol, represented by B′ in the "black" waveform of FIG. 2, is commenced. This generates a low EΔO pulse at the output of the NAND gate 91 (FIG. 3F) which is inverted by the inverter 93 to provide a high pulse at the output thereof, which is applied to the reset terminals of the counters 180, 182, 184, 186 (FIGS. 3D and 3G) of the "end of tag" counter bank 30 (FIG. 1), to reset these counters.

During sensing of the first white space, the "black" waveform if at a low logic level, the "black" waveform is at a high logic level, and the "odd" waveform is at a high logic level. Accordingly, a 357 KHz oscillating signal is passed through the gates 120 (FIG. 3C), 122, 150, a NOR gate 188 (FIG. 3H) and an inverter 190 to the counter 180 (FIG. 3D) to count up the counter stack 30.

During sensing of a second dark bar of the "end of tag" symbol, represented by C′ in the "black" waveform of FIG. 2, the "black" waveform is at a high logic level, the "black" waveform is at a low logic level, and the "odd" waveform remains at a high logic level. Accordingly, a 227 KHz oscillating signal is passed through the gates 126, 122, 150, the NOR gate 188 and the inverter 190 to the counter 180 to continue counting up of the counter bank 30. A conductor 192 extends from a terminal of the counter 186 of the counter bank 30 to one input of the gate 188 to prevent overflow of the counter bank 30 in the same manner as previously described in connection with the counter bank 24.

During sensing of the wide white margin area of the "end of tag" symbol, the "black" waveform is at a low logic level, the "black" waveform is at a high logic level, and the "odd" waveform is at a low logic level. Accordingly, the two inputs to the NOR gate 140 (FIG. 3C) are low, providing a high output which is presented at one input of the NAND gate 142 (FIG. 3B). The 130 KHz oscillating output from the inverter 70 accordingly passes through the gate 142 and is applied to a down-counting terminal of the counter 180 of the counter bank 30. Counting down of this counter bank continues during the sensing of the wide white margin area. If the counter bank counts back to zero, as it does in the case of sensing an "end of tag" symbol, a "borrow" is generated as a low-level pulse ZERO-4 at one terminal of the counter 186, and is applied to one input of a NOR gate 194 (FIG. 3H). Since the "odd" waveform is also low, the output of the gate 194 pulses high and is inverted by the NOR gate 176 to provide a low pulse $\overline{EOT}$ at the output of said gate, and at the terminal 178, to indicate that an "end of tag" symbol has been sensed.

While the form of the invention shown and described herein is admirably adapted to fulfill the objects aforesaid, it is to be understood that other and further modifications within the scope of the following claims may be made without departing from the spirit of the invention.

What is claimed is:

1. Symbol decoding means comprising
   scanning means for scanning a surface upon which coded data has been placed and generating a signal representative of the information scanned;
   means for generating a plurality of clock signals of different frequencies with the relationship of the frequencies based upon the relationship of a plurality of components of a code symbol to be identified;
   counting means; and
   means for applying the various frequencies to the counting means in accordance with the relationship of the different components of a symbol being scanned;
   whereby the condition of the counting means at the end of a scan of data provides an indication of whether or not the data scanned is the symbol.

2. Symbol decoding means comprising
   scanning means for scanning a surface upon which coded data has been placed and generating a signal representative of the information scanned;
   means for generating a plurality of clock signals of different frequencies with the relationship of the frequencies based upon the relationship of a plurality of components of a code symbol to be identified;
   counting means;
   first gating means for generating signals of first and second types from the signal generated by the scanning means;
   second gating means controlled by the clock signal generating means, the scanning means and the first gating means to provide inputs to said counting means; and
   third gating means controlled by said counting means and said first gating means for providing output signals for decoding at least one coded symbol.

3. The symbol decoding means of claim 2 in which said counting means includes first counting means for detecting a first symbol and second counting means for detecting a second symbol.

4. The symbol decoding means of claim 3 in which said first and second counting means each include first and second counters controlled, respectively, by said first and second types of signals generated by said first gating means.

5. The symbol decoding means of claim 3 in which said third gating means includes first output means controlled by said first counting means for providing an indication of whether or not a first symbol is present, and second output means controlled by said second counting means for providing an indication of whether or not a second symbol is present.

6. The symbol decoding means of claim 2 in which said first gating means controls the output from said generating means to cause signals of a first frequency to be input to the counting means to effect counting in a first direction, and further controls the output from said generating means to cause signals of second and third frequencies to be input to the counting means to effect counting in an opposite direction.

7. The symbol decoding means of claim 6 in which said counting means controls said third gating means to cause said third gating means to provide an output signal in accordance with whether or not the count in the opposite direction is of greater magnitude than the count in said first direction.

8. The symbol decoding means of claim 6 in which the ratio of said first, second and third frequencies is $4/11f$ to $f$ to $7/11f$.

9. The symbol decoding means of claim 6 in which the ratio of said first, second and third frequencies is $4/11f$ to $7/11f$ to $f$.

10. The symbol decoding means of claim 6 in which the symbol to be decoded is a "start of tag" symbol.

11. The symbol decoding means of claim 2 in which said first gating means controls the output from said generating means to cause signals of first and second frequencies to be input to the counting means to effect counting in a first direction, and further controls the output from said generating means to cause signals of a third frequency to be input to the counting means to effect counting in an opposite direction.

12. The symbol decoding means of claim 11 in which the ratio of the first, second and third frequencies is $f$ to $7/11f$ to $4/11f$.

13. The symbol decoding means of claim 11 in which the ratio of the first, second and third frequencies is $7/11f$ to $f$ to $4/11f$.

14. The symbol decoding means of claim 11 in which the symbol to be decoded is an "end of tag" symbol.

15. A system for decoding a "start of tag" symbol from record media encoded so that said symbol includes in combination a first area of one type at least four and one half units in width, a second area of a second type substantially one unit in width, a third area of said first type substantially one unit in width, and a fourth area of said second type substantially one unit in width, comprising scanning means for scanning a surface upon which coded data has
   been placed and generating a signal representative of the information scanned;
   means for generating a plurality of clock signals of different frequencies with the relationship of the frequencies based upon the relationship of various areas of the "start of tag" symbol;
   first and second counting means;
   first gating means for generating signals of first and second types from the signal generated by the scanning means;
   second gating means controlled by the clock signal generating means, the scanning means and the first gating means to provide inputs to said first and second counting means in accordance with whether the signals from said first gating means are of said first type or said second type, the output from said second gating means being caused by said first gating means to be input to said counting means to effect counting in a first direction by signals of a first frequency and to effect counting in an opposite direction by signals of second and third frequencies; and
   third gating means controlled by said first and second counting means and said first gating means for providing output signals to indicate the presence or absence of a "start of tag" signal in accordance with whether or not the count in said opposite direction is of greater magnitude than the count in said first direction.

16. The system of claim 15 in which the ratio of said first, second and third frequencies is 4/11f to $f$ to 7/11f.

17. The system of claim 15 in which the ratio of said first, second and third frequencies is 4/11f to 7/11f to $f$.

18. The system of claim 15 in which the code is a bar code, with the area of the first type being relatively light and the area of the second type being relatively dark.

19. A system for decoding an "end of tag" symbol from record media encoded so that said symbol includes in combination a first area of one type substantially one unit in width, a second area of a second type substantially one unit in width, a third area of said first type substantially one unit in width, and a fourth area of said second type at least four and one half units in width, comprising scanning means for scanning a surface upon which coded data has been placed and generating a signal representative of the information scanned;

means for generating a plurality of clock signals of different frequencies with the relationship of the frequencies based upon the relationship of various areas of the "end of tag" symbol;

first and second counting means;

first gating means for generating signals of first and second types from the signal generated by the scanning means;

second gating means controlled by the generating means and the first gating means to provide inputs to said first and second counting means in accordance with whether the signals from said first gating means are of said first type or said second type, the output from said second gating means being caused by said first gating means to be input to said counting means to effect counting in a first direction by signals of a first frequency and to effect counting in an opposite direction by signals of second and third frequencies; and third gating means controlled by said first and second counting means and said first gating means for providing output signals to indicate the presence or absence of an "end of tag" signal in accordance with whether or not the count in said opposite direction is of greater magnitude than the count in said first direction.

20. The system of claim 19 in which the ratio of said first, second and third frequencies is 7/11f to $f$ to 4/11f.

21. The system of claim 19 in which the ratio of said first, second and third frequencies is $f$ to 7/11f to 4/11f.

22. The system of claim 19 in which the code is a bar code, with the area of the first type being relatively dark and the area of the second type being relatively light.

23. A device for detecting a unique character represented by a combination of contrasting areas, said device comprising signal generating means;

means coupled to the signal generating means for deriving three clock signals of different frequencies, the third signal having a frequency equal to that of the sum of the frequencies of the first two signals;

sensing means for sensing the extents of said areas in one direction with respect to each other and generating signals representative of said relative extents of said areas;

up-down counting means;

gating means for passing each of the three clock signals of different frequencies to the up-down counting means for periods of time proportional to the relative extents of the contrasting areas, in predetermined directions and sequence so that the clock signals corresponding to one of the areas causes the up-down counting means to count in one direction, while the clock signals corresponding to at least one of the other areas cause the up-down counting means to count in the other direction, whereby the identify of the character being sensed is determined by whether or not the counter is counted back to its starting position.

24. A method for detecting a unique symbol represented by a combination of contrasting areas, comprising the steps of generating a signal having relatively high and low levels corresponding to predetermined characteristics of the symbol to be sensed;

generating a plurality of clock signals;

causing said clock signals to be counted in one direction and subsequently in an opposite direction, the ratio of the counts being related to the ratio of high and low signal levels to be derived from sensing a symbol having a predetermined relationship of contrasting areas; and comparing the counts in the two directions to determine whether or not the symbol sensed is the unique symbol.

25. The method of claim 24, in which the different frequencies are determined in accordance with a ratio based upon the relative dimensions of the contrasting areas of the symbol.

26. A method for detecting a unique symbol represented by a combination of contrasting areas, comprising the steps of generating a signal having relatively high and low levels corresponding to predetermined characteristics of the symbol to be sensed;

generating a plurality of clock signals of different frequencies;

causing at least one of said clock signals to be counted in one direction and at least one of said clock signals to be counted in an opposite direction, the ratio of the counts corresponding to the ratio of high and low signal levels to be derived from sensing a symbol having a predetermined relationship of contrasting areas; and comparing the counts in the two directions to determine whether or not the symbol sensed is the unique character.

27. A method for detecting a unique symbol represented by a combination of bars and spaces and for compensating for width variations in the printing of said bars, comprising the steps of establishing a predetermined ratio of given dimensions of bars and spaces for the unique symbol to be detected, said ratio taking into account a variation from standard width resulting from the manner in which bars are printed, to determine weights to be assigned to various bars and spaces of a symbol to be tested;

assigning different weights to the various widths measured in accordace with the relationship of bars and spaces in said unique symbol; and making a comparison of the weighted measurements to determine whether or not the symbol sensed is the unique symbol.

28. The method of claim 27 in which the unique symbol occupies a unique position in the tag.

29. The method of claim 28 in which the unique symbol is a start of tag symbol.

30. The method of claim 28 in which the unique symbol is an end of tag symbol.

31. The method of claim 27 in which the weighting is accomplished by use of different signal frequencies.

32. The method of claim 31 in which the comparison is accomplished by counting in two counting directions.

* * * * *

UNITED STATES PATENT OFFICE
CERTIFICATE OF CORRECTION

Patent No. 4,074,852      Dated February 21, 1978

Inventor(s) Robert D. Wescott and John B. Christie

It is certified that error appears in the above-identified patent and that said Letters Patent are hereby corrected as shown below:

Column 16, line 4, delete "identify" and substitute

--identity--.

Signed and Sealed this

Seventeenth Day of October 1978

[SEAL]

Attest:

RUTH C. MASON
*Attesting Officer*

DONALD W. BANNER
*Commissioner of Patents and Trademarks*